United States Patent
Kim et al.

(10) Patent No.: US 9,821,658 B1
(45) Date of Patent: Nov. 21, 2017

(54) METHOD FOR CONTROLLING VEHICLE CREEP DRIVING

(71) Applicant: Hyundai Motor Company, Seoul (KR)

(72) Inventors: Jin Sung Kim, Hwaseong-si (KR); Hwan Hur, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/368,052

(22) Filed: Dec. 2, 2016

(30) Foreign Application Priority Data

Sep. 12, 2016 (KR) .......................... 10-2016-0117437

(51) Int. Cl.
*B60W 30/18* (2012.01)
*B60K 31/00* (2006.01)
*B60W 10/02* (2006.01)

(52) U.S. Cl.
CPC ............. *B60K 31/00* (2013.01); *B60W 10/02* (2013.01); *B60K 2031/0091* (2013.01); *B60W 2510/1005* (2013.01); *B60W 2520/10* (2013.01); *B60W 2530/10* (2013.01); *B60W 2710/027* (2013.01)

(58) Field of Classification Search
CPC ........... B60W 10/02; B60W 30/18063; B60W 2710/027; B60K 31/00
See application file for complete search history.

(56) References Cited

U.S. PATENT DOCUMENTS

| 5,314,050 | A | * | 5/1994 | Slicker | B60W 10/02 477/171 |
|---|---|---|---|---|---|
| 6,599,220 | B2 | | 7/2003 | Narita et al. | |
| 2004/0236537 | A1 | * | 11/2004 | Eich | F16H 61/12 702/182 |
| 2015/0226321 | A1 | * | 8/2015 | Dunfee, II | F16H 61/08 701/51 |
| 2015/0336583 | A1 | | 11/2015 | Pursifull et al. | |
| 2016/0090006 | A1 | | 3/2016 | Yamazaki et al. | |

FOREIGN PATENT DOCUMENTS

| EP | 1010920 A2 | 6/2000 |
|---|---|---|
| JP | 3680746 B2 | 8/2005 |
| KR | 10-2014-0060013 A | 5/2014 |

* cited by examiner

*Primary Examiner* — Edwin A Young
(74) *Attorney, Agent, or Firm* — McDermott Will & Emery LLP

(57) ABSTRACT

A method for controlling vehicle creep driving includes learning, by a controller, a touch point of a clutch when a condition for creep driving is satisfied, changing, by the controller, an upper limit of a creep clutch torque, which is set as a permissible maximum torque of the clutch during creep driving, depending on the learned touch point, and controlling, by the controller, creep driving such that the creep clutch torque required for creep driving is set to be equal to or less than the changed upper limit of the creep clutch torque, and the creep clutch torque is output.

5 Claims, 3 Drawing Sheets

METHOD FOR CONTROLLING VEHICLE CREEP DRIVING

CROSS REFERENCE TO RELATED APPLICATION

The present application claims the benefit of priority to Korean Patent Application No. 10-2016-0117437, filed Sep. 12, 2016 with the Korean Intellectual Property Office, the entire content of which is incorporated herein for all purposes by this reference.

TECHNICAL FIELD

The present disclosure relates to a method for controlling vehicle creep driving, which enables the vehicle to start driving by engaging a clutch even when a large error is present in the learned touch point.

BACKGROUND

In the case of a general automatic transmission system, because a torque converter functions as a fluid clutch, a damping effect may be achieved. This is advantageous when launching a vehicle or shifting between gears.

Meanwhile, an Automated Manual Transmission (AMT) system and a Dual-Clutch Transmission (DCT) system automatically control a clutch based on a manual transmission mechanism, and moreover do not use a torque converter, thus resulting in high fuel efficiency.

Here, the AMT system improves fuel efficiency and power transmission efficiency by directly connecting an engine to a clutch, but has no damping element. Accordingly, it is problematic in that a sudden shock, clutch slippage and the like may occur when torque changes. Therefore, there is a need for an algorithm for learning the touch point of the clutch in real time.

During such a learning process, when the learned touch point of a clutch (the position of an actuator when clutch torque is applied) is lowered below the actual position due to some unknown disturbance, the clutch cannot be engaged.

Here, if the stroke (position) of a clutch actuator can be moved within a mechanically permissible range, engine torque may be delivered, but because there is a limitation as to the amount of torque that the engine may output at idle speed during creep driving, an infinite increase in the clutch torque may result in engine hesitation.

In order to prevent this, the clutch torque during creep driving has an upper limit, and when the stroke of the clutch actuator is not continuously increased due to the upper limit, the clutch cannot be engaged, and thus a vehicle may be unable to start moving. In this case, it may be erroneously determined that the vehicle has developed an error.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made in light of the above problems occurring in the related art, and the present disclosure is intended to provide a method for controlling vehicle creep driving, which enables the vehicle to start driving by engaging a clutch even when a large error is present in a learned touch point.

In order to achieve the above object, a method for controlling vehicle creep driving according to exemplary embodiments of the present disclosure includes learning, by a controller, a touch point of a clutch when a condition for creep driving is satisfied; changing, by the controller, an upper limit of a creep clutch torque, which is set as a permissible maximum torque of the clutch during creep driving, depending on the learned touch point; and controlling, by the controller, creep driving such that the creep clutch torque required for creep driving is set to be equal to or less than the changed upper limit of the creep clutch torque, and the creep clutch torque is output.

In the step of changing the upper limit of the creep clutch torque, when the learned touch point is equal to or less than a reference value, the upper limit of the creep clutch torque may be increased.

In the step of changing the upper limit of the creep clutch torque, when the learned touch point is equal to or less than a reference value, the upper limit of the creep clutch torque may be set to be inversely proportional to the learned touch point.

The step of controlling creep driving may include calculating a feedforward creep torque using a relationship between a weight of the vehicle and a gear ratio; calculating a feedback creep torque in order for a current speed of the vehicle to be adjusted to match a target creep speed; and selecting a lower value from among a creep operation torque, which is a sum of the feedforward creep torque and the feedback creep torque, and the upper limit of the creep clutch torque as the creep clutch torque and outputting the set creep clutch torque.

The method may further include relearning the touch point of the clutch when a current speed of the vehicle exceeds a creep speed after controlling creep driving.

According to the present disclosure, when a learned touch point is greatly decreased because an error is present in a T-S curve, which represents the characteristic of a clutch, the upper limit of a creep clutch torque is increased, whereby the clutch is engaged and a vehicle may start driving. Therefore, the erroneous determination of the occurrence of a fault in the vehicle may be prevented.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

An exemplary embodiment of the present disclosure will be described below with reference to the accompanying drawings.

A method for controlling vehicle creep driving according to exemplary embodiments of the present disclosure may include a learning step, a variation step and a driving control step.

Figure 1:
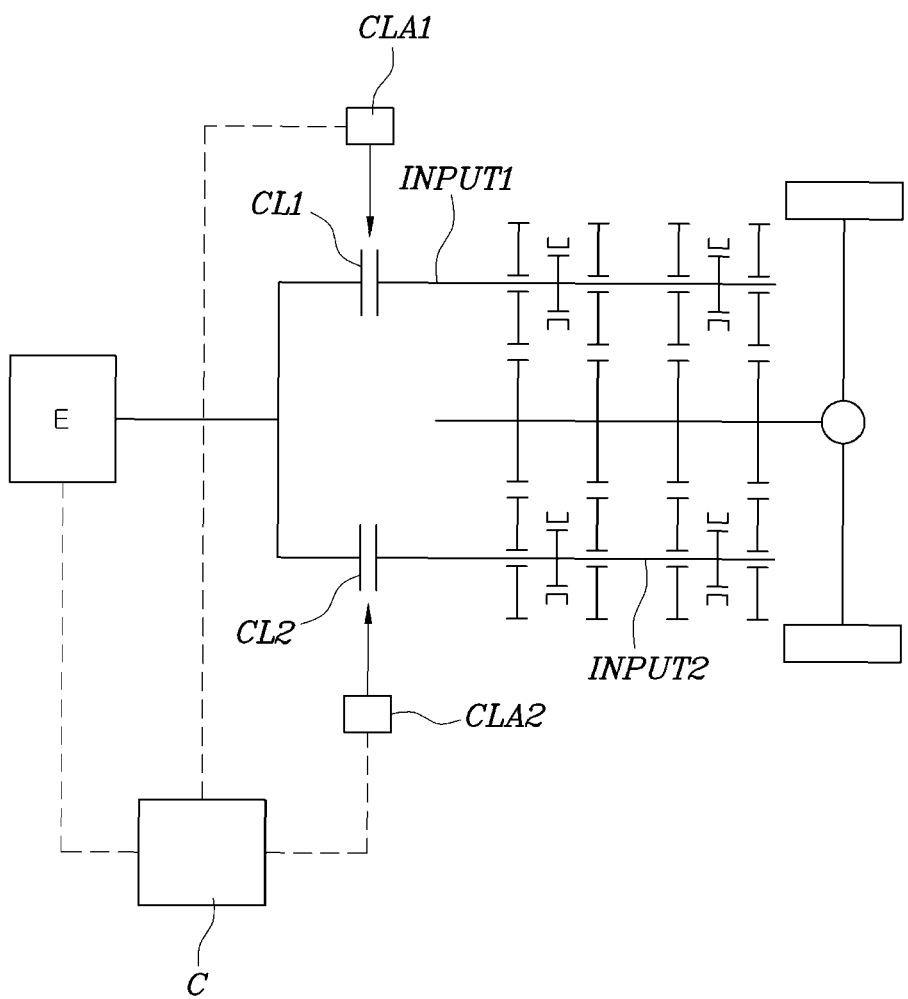
FIG. 1 is a view illustrating a configuration of a Dual-Clutch Transmission (DCT) that may be applied to exemplary embodiments of present disclosure.
Figure 2:
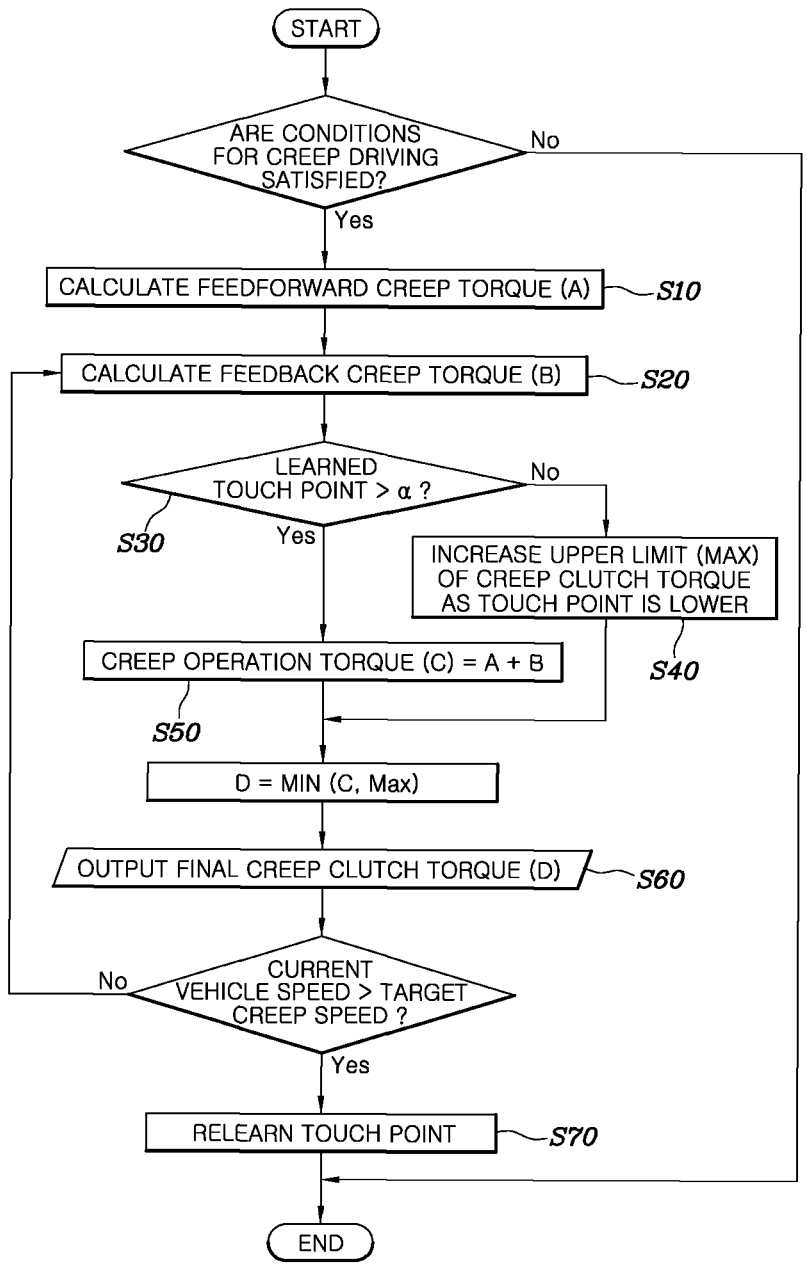
FIG. 2 is a flowchart for describing a control of creep driving according to exemplary embodiments of the present disclosure.

Specifically describing the present disclosure with reference to FIG. 1 and FIG. 2, first, at the learning step, a touch point of a clutch may be learned when a controller C determines that a condition for creep driving is satisfied based on the vehicle speed, an APS value, the current gear and the like.

Here, when a dry clutch is used in a DCT vehicle, a transmission torque characteristic of the clutch may be estimated using a Torque-Stroke (T-S) curve of the dry clutch, which is estimated while driving the vehicle, whereby the touch point of the clutch may be learned.

Here, the T-S curve is a curve illustrating the transmission torque characteristic of the dry clutch depending on the stroke of a clutch actuator.

FIG. 1 illustrates an example of a configuration of a DCT, which may be applied to exemplary embodiments of the present disclosure. Among the two clutches of the DCT, an engagement-side clutch and a disengagement-side clutch are respectively expressed using the reference numerals, or indicators, CL1 and CL2, and an engagement-side clutch actuator and a disengagement-side clutch actuator, which operate the engagement-side clutch and the disengagement-side clutch, are respectively expressed using the reference numerals, or indicators, CLA1 and CLA2. Also, an engagement-side input shaft and a disengagement-side input shaft are respectively expressed using the reference numerals, or indicators, INPUT1 and INPUT2. However, such an arrangement is merely an example for convenience of understanding the present disclosure, and the engagement-side and the disengagement-side may be switched therebetween depending on the clutch that is currently engaged for the current gear and the clutch that is to be engaged for a target gear.

That is, in the present disclosure, when the condition for creep driving is satisfied, the touch point of the engagement-side clutch, which is used to launch a vehicle, may be learned.

Figure 3A:
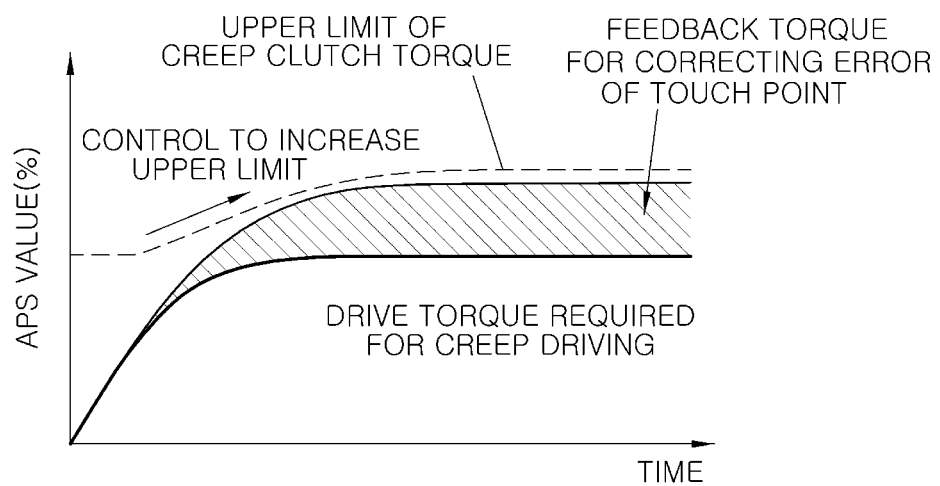
FIG. 3A and FIG. 3B are views for describing an operation in which a creep clutch torque, set by changing an upper limit thereof depending on a learned touch point, is output according to exemplary embodiments of the present disclosure.
Figure 3B:
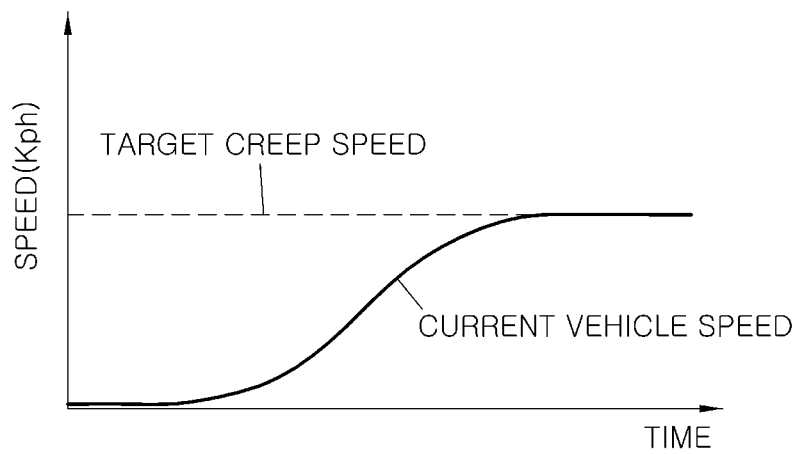

Also, as shown in FIG. 2, FIG. 3A and FIG. 3B, at the variation step, the controller C changes an upper limit of the creep clutch torque, which is set as a permissible maximum value during creep driving, depending on the learned touch point.

Specifically, at the variation step, when the learned touch point is equal to or less than a reference value α, the upper limit of the creep clutch torque may be increased.

When the learned touch point is equal to or less than the reference value α, the upper limit of the creep clutch torque may be set to be inversely proportional to the learned touch point.

That is, the maximum creep clutch torque that is capable of being output during creep driving is limited to the upper limit of the creep clutch torque. However, when the learned touch point is greatly decreased due to an error, the upper limit of the creep clutch torque is increased.

In the driving control step, the controller C may control creep driving by setting the creep clutch torque required for creep driving to be equal to or less than the changed upper limit of the creep clutch torque and outputting the set creep clutch torque.

According to the configuration described above, when the learned touch point is greatly decreased because an error is present in the T-S curve representing the characteristic of the clutch, the upper limit of the creep clutch torque is increased as the touch point is lowered, whereby the clutch may be engaged. Accordingly, the vehicle may start driving and creep forward.

Additionally, the driving control step may be configured to include a feedforward step, a feedback step and an output step.

Referring to FIG. 2, at the feedforward step, a feedforward creep torque A may be calculated using the relationship between the weight of a vehicle and a gear ratio.

At the feedback step, a feedback creep torque B, which is needed in order for the current speed of the vehicle to be adjusted to match a target creep speed, may be calculated using the difference between the current speed of the vehicle and the target creep speed.

At the output step, a creep operation torque C is calculated by adding the feedforward creep torque and the feedback creep torque, the smaller value among the calculated creep operation torque C and the upper limit of the creep clutch torque MAX is selected, and the selected value is finally output as the creep clutch torque D, whereby the operation of the clutch may be controlled.

That is, when the learned touch point rapidly decreases, the clutch may be engaged through feedback control of the creep clutch torque. However, because the engine E is controlled to run at idle speed during creep driving, the creep clutch torque may not be infinitely increased. Accordingly, the clutch is engaged in the state in which the range of feedback is limited by setting the upper limit of the creep clutch torque.

Additionally, a relearning step in which the touch point is corrected by relearning the touch point when the current speed of the vehicle exceeds the set creep speed may be further included after the driving control step.

In other words, when an error is present in the learned touch point, because it is important to launch a vehicle, the clutch is engaged by setting the upper limit of the creep clutch torque higher, so that the vehicle may start driving. After that, the touch point may be corrected by relearning the touch point when the vehicle is accelerated by depressing an accelerator pedal. Accordingly, engine hesitation attributable to an excessive amount of feedback may be prevented.

Hereinafter, a method for controlling vehicle creep driving according to exemplary embodiments of the present disclosure will be described.

Referring to FIG. 2, FIG. 3A and FIG. 3B, when the condition for creep driving of a vehicle is satisfied, a feedforward creep torque and a feedback creep torque are calculated at steps S10 and S20.

Then, the learned touch point of an engagement-side clutch, which is used to launch the vehicle, is measured and compared with a reference value a at step S30, and when the learned touch point is equal to or less than the reference value, the upper limit of the creep clutch torque is increased at step S40. In this case, the lower the learned touch point, the higher the upper limit of the creep clutch torque may be set.

Subsequently, the creep operation torque is calculated by adding the feedforward creep torque and the feedback creep torque at step S50, the creep clutch torque is set to the lower value of the calculated creep operation torque and the upper limit of the creep clutch torque, and the operation of a clutch actuator is controlled using the set creep clutch torque at step 60.

That is, the clutch is engaged through the feedback control of the clutch actuator, which is performed in order to follow the target creep speed by eliminating any difference between the current speed of the vehicle and the target creep speed. Thus, a vehicle may launch, after which the vehicle may be driven at the target creep speed.

Furthermore, when the current vehicle speed is found to exceed the target creep speed after the clutch is engaged by the operation of the clutch actuator, the touch point is relearned and thereby corrected at step S70.

As described above, the present disclosure sets the upper limit of the creep clutch torque higher when the learned touch point is greatly decreased because an error is present in the T-S curve, which represents the characteristic of the clutch. Accordingly, the clutch may be engaged and the vehicle may start driving. Therefore, an erroneous determination that a fault has occurred in the vehicle may be prevented.

Although exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method for controlling vehicle creep driving, comprising:
   learning, by a controller, a touch point of a clutch when a condition for creep driving is satisfied;
   changing, by the controller, an upper limit of a creep clutch torque, which is set as a permissible maximum torque of the clutch during creep driving, depending on the learned touch point; and
   controlling, by the controller, creep driving such that the creep clutch torque required for creep driving is set to be equal to or less than the changed upper limit of the creep clutch torque, and the creep clutch torque is output.

2. The method of claim 1, wherein in the step of changing the upper limit of the creep clutch torque, when the learned touch point is equal to or less than a reference value, the upper limit of the creep clutch torque is increased.

3. The method of claim 1, wherein in the step of changing the upper limit of the creep clutch torque, when the learned touch point is equal to or less than a reference value, the upper limit of the creep clutch torque is set to be inversely proportional to the learned touch point.

4. The method of claim 1, wherein the step of controlling creep driving further comprises:
   calculating a feedforward creep torque using a relationship between a weight of the vehicle and a gear ratio;
   calculating a feedback creep torque in order for a current speed of the vehicle to be adjusted to match a target creep speed; and
   selecting a lower value from among a creep operation torque, which is a sum of the feedforward creep torque and the feedback creep torque, and the upper limit of the creep clutch torque as the creep clutch torque and outputting the set creep clutch torque.

5. The method of claim 1, further comprising relearning the touch point of the clutch when a current speed of the vehicle exceeds a creep speed after controlling creep driving.

* * * * *